US012512613B2

(12) United States Patent
Shimoyama et al.

(10) Patent No.: US 12,512,613 B2
(45) Date of Patent: Dec. 30, 2025

(54) HIGH-FREQUENCY SIGNAL TRANSMISSION DEVICE AND ELECTRICAL CONNECTION METHOD FOR WIRING BOARD AND CONNECTOR

(71) Applicant: YAMAICHI ELECTRONICS CO., LTD., Tokyo (JP)

(72) Inventors: Takahiro Shimoyama, Tokyo (JP); Akira Yonezawa, Tokyo (JP); Hiroshi Takahira, Tokyo (JP)

(73) Assignee: YAMAICHI ELECTRONICS CO., LTD., Tokyo (JP)

( * ) Notice: Subject to any disclaimer, the term of this patent is extended or adjusted under 35 U.S.C. 154(b) by 356 days.

(21) Appl. No.: 18/209,235

(22) Filed: Jun. 13, 2023

(65) Prior Publication Data

US 2023/0402775 A1 Dec. 14, 2023

(30) Foreign Application Priority Data

Jun. 14, 2022 (JP) ................................ 2022-095975

(51) Int. Cl.
*H01R 12/67* (2011.01)
*H01R 12/79* (2011.01)

(52) U.S. Cl.
CPC ............ *H01R 12/67* (2013.01); *H01R 12/79* (2013.01)

(58) Field of Classification Search
None
See application file for complete search history.

(56) References Cited

U.S. PATENT DOCUMENTS

| | | | | |
|---|---|---|---|---|
| 7,688,594 | B2 | 3/2010 | Muto et al. | |
| 9,788,426 | B2 * | 10/2017 | Ishida | H01R 12/78 |
| 11,081,822 | B2 * | 8/2021 | Buck | H01R 13/6471 |
| 2017/0271797 | A1 | 9/2017 | Ito et al. | |
| 2021/0249153 | A1 | 8/2021 | Kojima et al. | |

FOREIGN PATENT DOCUMENTS

| | | | |
|---|---|---|---|
| CN | 112106151 | A | 12/2020 |
| EP | 2733791 | A1 | 5/2014 |
| EP | 3509167 | A1 | 7/2019 |
| JP | 2007-234500 | A | 9/2007 |
| JP | 2007324178 | A | 12/2007 |
| JP | 2014102916 | A | 11/2012 |
| JP | 5580994 | B2 | 8/2014 |
| JP | 201612668 | A | 1/2016 |
| JP | 2016143455 | A | 8/2016 |
| JP | 6721845 | B2 | 7/2020 |

* cited by examiner

*Primary Examiner* — Ross N Gushi
(74) *Attorney, Agent, or Firm* — Hayes Soloway PC

(57) ABSTRACT

According to an embodiment, high-frequency signal transmission device includes a connector and a wiring board with two cable ends. The connector includes contact terminals with signal contact terminals and ground contact terminals. In a wiring board, signal contact pads, ground contact pads and one or more ground layers are formed on at least one of the cable ends. The ground contact terminal includes an arm portion bent so as to locally abut against the ground contact pad at a contact portion. The contact portion of the arm portion is positioned so as to (i) at least partially abut against a surface of a covering portion of the ground contact pad covering the first penetrating electrode directly above the first penetrating electrode, or (ii) abut against the ground contact pad near an outer periphery of the covering portion, when the wiring board is electrically connected to the connector.

13 Claims, 11 Drawing Sheets

HIGH-FREQUENCY SIGNAL TRANSMISSION DEVICE AND ELECTRICAL CONNECTION METHOD FOR WIRING BOARD AND CONNECTOR

CROSS-REFERENCE TO RELATED APPLICATION

This application claims the benefit of Japanese Patent application JP 2022-095975 filed on Jun. 14, 2022, the contents of which are incorporated herein by reference herein.

TECHNICAL FIELD

The present disclosure relates to a high-frequency signal transmission device, and an electrical connection method for a wiring board and a connector

BACKGROUND

Japanese Patent Application Publication No. 2007-234500 (hereinafter referred to as "Patent Document 1") discloses an FPC for high-speed transmission with good impedance matching. In particular, a high speed transmission path and a ground pattern are formed on one surface of the base. A first ground layer is laminated on this one surface of the base via a dielectric sheet. A base second ground layer is laminated on the other surface of the base. The ground pattern described above is electrically connected to the first and the second ground layers via a through hole. In particular, the cross-sectional configuration of the end portion of the FPC is illustrated in FIG. 5 of the same document.

A configuration in which the front and back ground lines are electrically connected via a contact hole is also disclosed in Japanese Patent Publication No. 5580994 (hereinafter referred to as "Patent Document 2") (see FIGS. 1 and 2 in the same document). Japanese Patent Publication No. 6721845 (hereinafter referred to as "Patent Document 3") discloses connecting a flexible cable and a connector using an adapter.

There is room to improve the high-frequency signal transmission characteristics of the entire device including a connector in addition to a wiring board in a form where the ground contact terminal of the connector contacts the ground contact pad of the wiring board.

SUMMARY

In accordance with a first aspect of the present disclosure, there is provided a high-frequency signal transmission device including: a connector in which a contact terminal group with a plurality of contact terminals arranged in a regular manner is supported by an insulator, the plurality of contact terminals including a plurality of signal contact terminals and a plurality of ground contact terminals; and a wiring board in which a plurality of signal contact pads, a plurality of ground contact pads, and one or more ground layers are formed on at least one of cable ends, and the one or more ground layers are electrically connected to the ground contact pads via at least one first penetrating electrode penetrating a dielectric layer of the wiring board. The ground contact terminal has an arm portion bent so as to locally abut against the ground contact pad at a contact portion. When the wiring board is electrically connected to the connector, the contact portion of the arm portion is positioned so as to (i) at least partially abut against a surface of a covering portion of the ground contact pad covering the first penetrating electrode directly above the first penetrating electrode, or (ii) abut against the ground contact pad near an outer periphery of the covering portion.

In accordance with a second aspect of the present disclosure, there is provided an electrical connection method for a wiring board and a connector in which a contact terminal group with a plurality of contact terminals arranged in a regular manner is supported by an insulator, the plurality of contact terminals including a plurality of signal contact terminals and a plurality of ground contact terminals.

A plurality of signal contact pads, a plurality of ground contact pads, and one or more ground layers are formed on at least one of cable ends of the wiring board, and the one or more ground layers are electrically connected to the ground contact pads via at least one first penetrating electrode penetrating a dielectric layer.

The method includes a step of positioning a contact portion of the ground contact terminal so as to (i) at least partially abut against a surface of a covering portion of the ground contact pad covering the first penetrating electrode directly above the first penetrating electrode, or (ii) abut against the ground contact pad near an outer periphery of the covering portion.

In accordance with an aspect of the present disclosure, it is possible to improve the high-frequency signal transmission characteristics of the entire device including a connector in addition to a wiring board.

DETAILED DESCRIPTION

Figure 1:
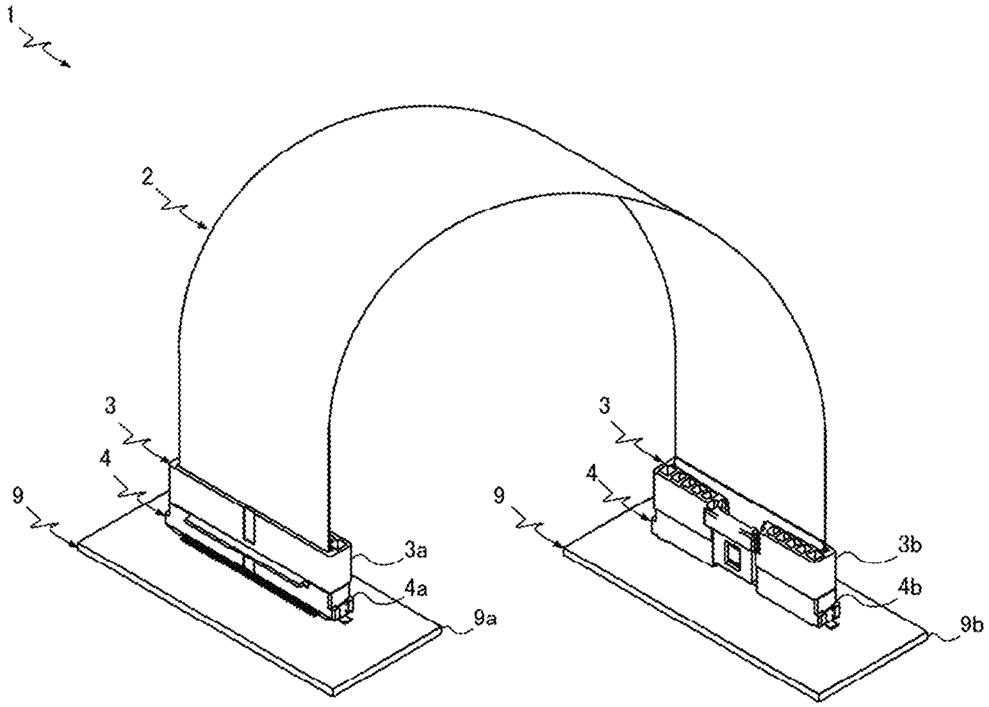
FIG. 1 is a schematic perspective view of a high-frequency signal transmission device according to one embodiment of the present disclosure, and a substrate communicatively connected via the high-frequency signal transmission device is also illustrated.
Figure 2:
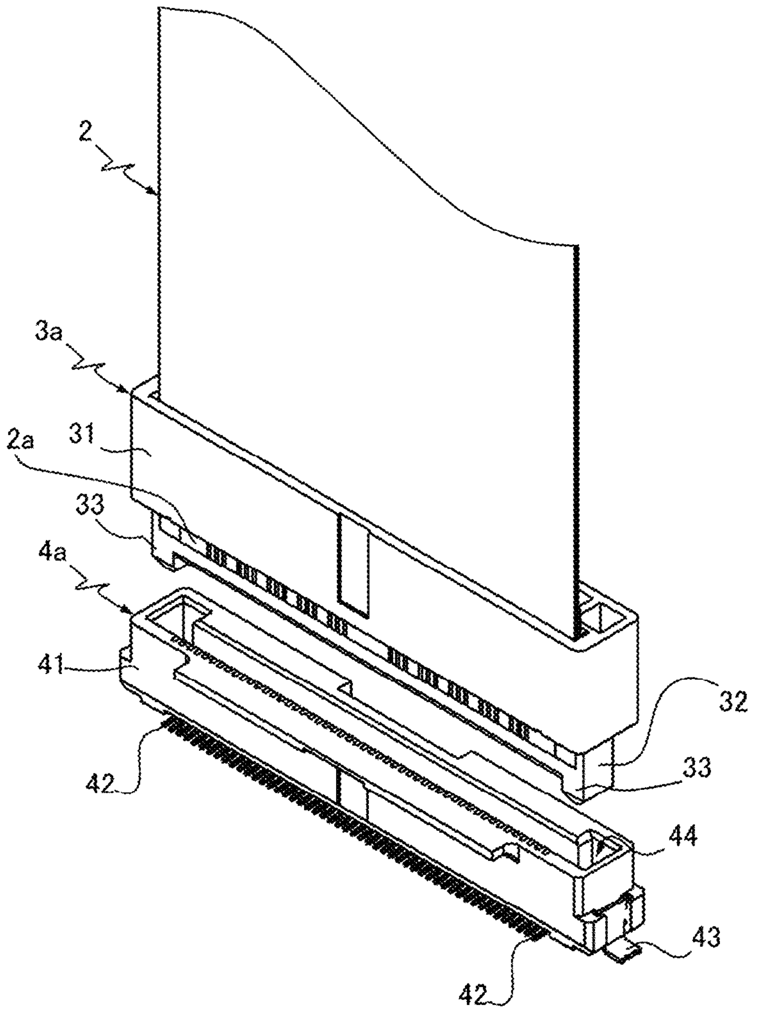
FIG. 2 is a schematic exploded perspective view in which one cable end of the FPC is removed from the connector.

Hereinafter, various embodiments and features according the present disclosure are explained with reference to drawings. Those skilled in the art can combine each embodiment and/or each feature without requiring excessive explanation, and can also understand the synergistic effects of this combination. Redundant explanations among the embodiments will be omitted in principle. The reference drawings are primarily for the purpose of describing the invention and are simplified for drawing convenience. Each feature is not effective only for the high-frequency signal transmission device and the method related thereto disclosed in the present specification, and is understood as a universal feature applicable to various other high-frequency signal transmission devices and methods related thereto which are not disclosed in this specification.

Referring to FIG. 1 to FIG. 4, a high-frequency signal transmission device 1 has an FPC (Flexible Printed Circuit) 2, adapters 3*a*, 3*b* (collectively referred to as adapter 3), and connectors 4*a*, 4*b* (collectively referred to as connector 4). Cable ends 2*a*, 2*b* of the FPC 2 are electrically connected to the connectors 4*a*, 4*b*, respectively (for example, based on mechanical connections between the adapters 3*a*, 3*b* and the connectors 4*a*, 4*b*). The connectors 4*a*, 4*b* are mounted on different substrates 9*a*, 9*b* or on different substrate parts of the same substrate and are electrically connected. Thus, inter-substrate communication via a high-frequency signal transmission device 1 becomes possible.

An FPC 2 is a flexible cable which is an unrestricted example of a wiring board. The FPC 2 can have various shapes, and in addition to extending in one direction at a predetermined width, it can also meander and extend, or extend to draw an S or L shape. The FPC 2 can also have a width that changes in its extending direction, and can include, for example, a width narrow portion, a width wide portion, a tapered portion, etc.

The FPC 2 has one or more transmission paths 7 for high-frequency signal transmission between its cable ends 2*a*, 2*b*. Typically, a plurality of transmission paths 7 are arranged in the width direction of the FPC 2. As can be seen from the explanation described later, a plurality of signal contact pads P1, a plurality of ground contact pads P2, and one or more ground layers 27 are formed at respective cable ends 2*a*, 2*b* of the FPC 2 (see FIG. 4 to FIG. 6). The one or more ground layers 27 are electrically connected to the ground contact pad P2 via at least one the first penetrating electrode 28 penetrating the dielectric layer 50. It is to be noted that it is also possible to form a slit between transmission paths 7 adjacent in the width direction of the FPC 2.

The adapters 3*a*, 3*b* are each attached to the cable ends 2*a*, 2*b* of the FPC 2 to support the cable ends 2*a*, 2*b*. The adapter 3 has a main body 31 shaped to accommodate the cable end of the FPC 2, a protruding portion 32 protruding from the main body 31 to support the cable end of the FPC 2, and a pair of alignment projections 33 provided on both sides to sandwich the protruding portion 32. The adapter 3 is shaped to have a wide width in the same direction as the FPC 2. When an adapter 3 is attached to the FPC 2, the signal and ground contact pads P1, P2 of the FPC 2 are arranged between the alignment projections 33. The adapters 3*a*, 3*b* are mechanically connected to the connectors 4*a*, 4*b*, and the cable ends 2*a*, 2*b* of the FPC 2 are positioned in predetermined positions in the connectors 4*a*, 4*b*.

The connector 4 has an insulator 41 shaped to have an insertion space 44 into which least the cable ends 2*a*, 2*b* of the FPC 2 are inserted, an array of contact terminals 42 (signal and ground contact terminals may be collectively referred to as contact terminals) (that is, a contact terminal group) supported by the insulator 41, and a fixing bracket 43 for fixing the connector 4 to the substrate 9. The insulator 41 is shaped to have a wide width in the same direction as the FPC 2. The contact terminals 42 (specifically, the signal and ground contact terminals) are arranged in a regular manner in the array of the contact terminals 42. More specifically, the same or different contact terminals 42 adjacent in array direction of the contact terminals 42 (typically, the width direction of the connector 4) are arranged at the same or different pitches. The form in which the contact terminals 42 are supported by the insulator 41 can be achieved by various methods such as insert molding, press fitting, and adhesion. It is to be noted that, in addition to the cable ends 2*a*, 2*b* of the FPC 2, the protruding portion 32 and the alignment projections 33 of the adapter 3 are inserted into the insertion space 44 of the insulator 41. For this purpose, the insertion space 44 of the insulator 41 is appropriately shaped.

Figure 3:
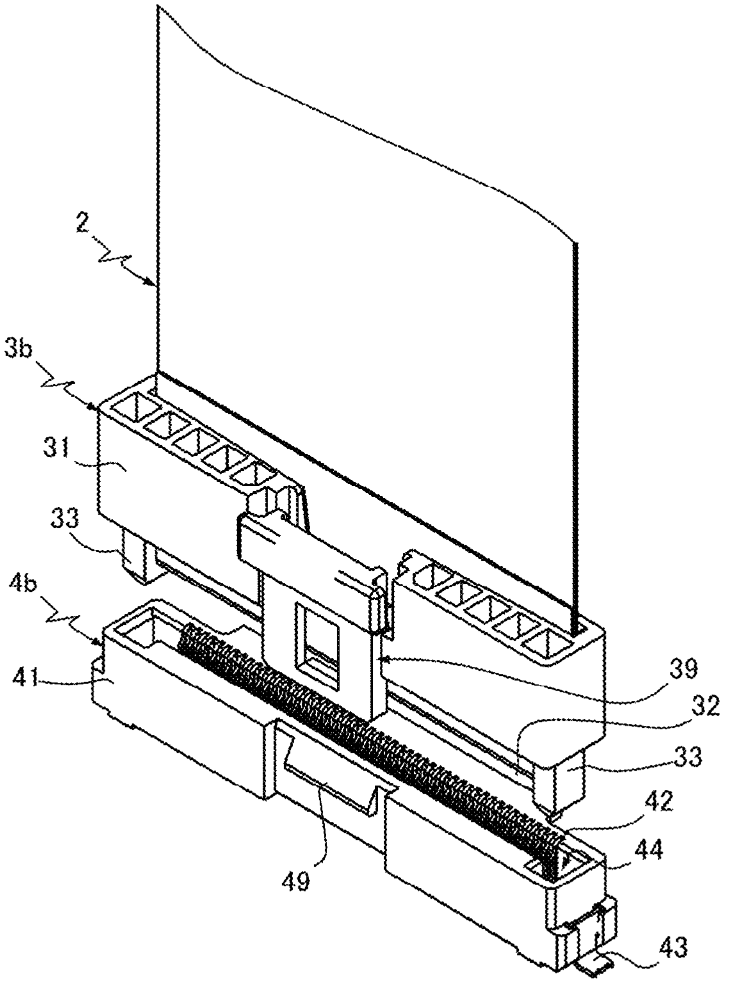
FIG. 3 is a perspective view of the opposite side of FIG. 2.

A lock projection 49 can be provided on the outer surface of the insulator 41 of the connector 4, and a locked portion 39 locked by the lock projection 49 can be provided to adapter 3 (see FIG. 3). Thus, it is possible to prevent the adapter 3 from unintentionally detaching from the connector 4, and position accuracy of the adapter 3 with respect to the connector 4 is enhanced. It is also possible to provide the lock projection to the adapter 3 and provide the locked portion to the connector 4. Lock locations of the lock projections and the locked portions can also be provided at 2 or more location. Furthermore, the FPC 2 can also be directly connected to the connector 4 without using an adapter 3.

Figure 4:
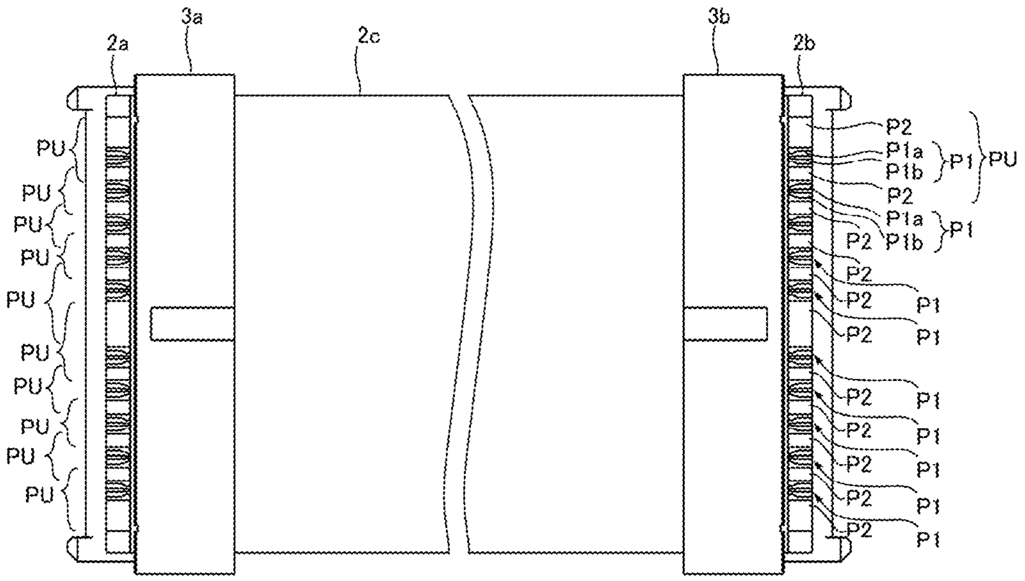
FIG. 4 is a schematic top view of an FPC with adapters, and each cable end of the FPC is supported by each adapter.
Figure 5:
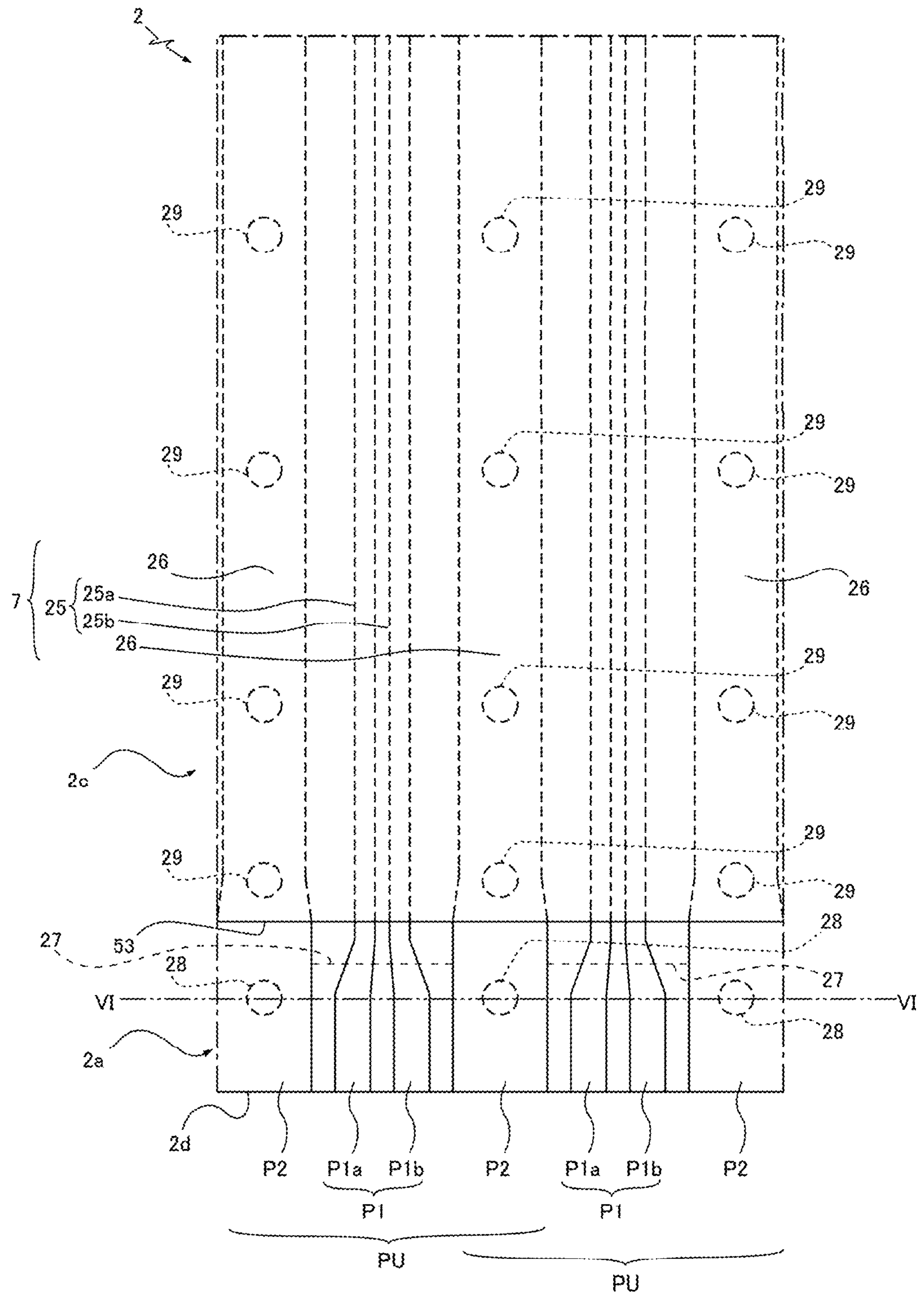
FIG. 5 is a schematic partial top view of the FPC; a first penetrating electrode is positioned in the center of the width of the ground contact pad, and a second penetrating electrode is positioned in the center of the width of the ground line.

Referring to FIG. 4 and FIG. 5, a plurality of transmission paths 7 are arranged in the width direction of the FPC 2. The transmission path 7 includes a differential signal line 25 composed of two signal lines 25*a*, 25*b* through which differential signals are transmitted, and a pair of ground lines 26 formed on both sides of the differential signal line 25 so as to sandwich the differential signal line 25 in the width direction of the FPC 2. The differential signal line 25 (signal lines 25*a*, 25*b*) is formed over between the cable end 2*a* and the cable end 2*b*. Similarly, a pair of ground lines 26 is formed over between the cable end 2*a* and the cable end 2*b*.

An array of signal contact pads P1*a*, P1*b* (collectively referred to as signal contact pads P1) and ground contact pads P2 is formed at the cable ends 2*a*, 2*b* of the FPC 2. The signal and ground contact pads P1, P2 may be arranged in the width direction of the FPC 2 to form a unit array PU in which the pair of signal contact pads P1*a*, P1*b* is sandwiched by two ground contact pads P2. It is to be noted that the signal contact pads P1*a*, P1*b* are each formed in the same layer as the signal lines 25*a*, 25*b* of the differential signal line 25 and connected thereto. The signal contact pads P1*a*, P1*b* have areas not covered by the first cover lay 53 described later due to contact with the signal contact terminal. The ground contact pad P2 is formed in the same layer as the ground line 26 and connected thereto. The ground contact pad P2 has an area not covered by the first cover lay 53 described later due to contact with the ground contact terminal. The signal contact pad can be regarded as an exposed portion of the signal line and the ground contact pad can be regarded as an exposed portion of the ground line.

In some cases, one ground line 26 is provided between differential signal lines 25 adjacent in the width direction of the FPC 2. The differential signal lines 25 adjacent in the width direction of the FPC 2 are electromagnetically coupled to a common ground line 26 formed between them. Similarly, one ground contact pad P2 is provided between pairs of the signal contact pads P1*a*, P1*b* adjacent in the width direction of the FPC 2. The pairs of the signal contact pads P1*a*, P1*b* adjacent in the width direction of the FPC 2 are electromagnetically coupled to a common ground contact pad P2 formed between these pairs. In the case described above, the ground line 26 and/or the ground contact pad P2 can be formed to have a wide width, and forming a penetrating electrode described later by a cheaper method is facilitated.

Figure 6:
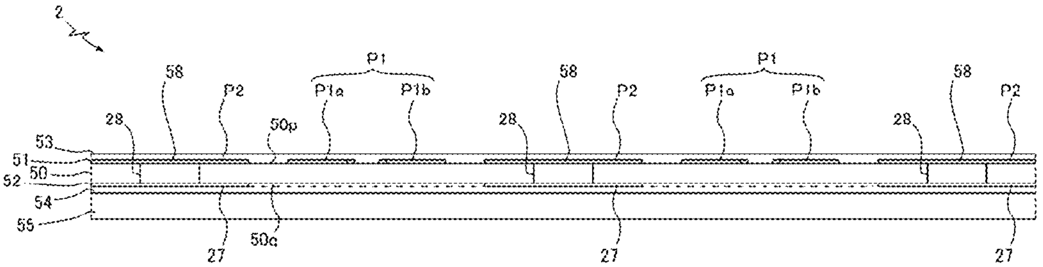
FIG. 6 is a schematic partial cross-sectional diagram of the FPC along the double-dotted line VI-VI in FIG. 5.

As can be seen from FIG. 6, the FPC 2 has a dielectric layer 50 with a layer thickness determined by a first surface 50*p* and a second surface 50*q*; a first wiring layer 51 formed on the first surface 50*p* of the dielectric layer 50; a second wiring layer 52 formed on the second surface 50*q* of the dielectric layer 50; a first cover lay 53 laminated on the first surface 50*p* of the dielectric layer 50 via the first wiring layer 51; a second cover lay 54 laminated on the second surface 50*q* of the dielectric layer 50 via the second wiring layer 52; and a reinforcing plate 55. It is to be noted that the reinforcing plate 55 is provided for assembly to the adapter 3 and is not formed over the entire length of the FPC 2.

The dielectric layer 50 is made of a material having a predetermined dielectric constant, for example, a liquid crystal polymer. The first wiring layer 51 may be a wiring layer patterned with metal foil. The differential signal line 25 and the ground line 26 described above are formed in the first wiring layer 51. The second wiring layer 52 may be a wiring layer patterned with metal foil. One or more ground layers 27 electrically connected to the ground contact pad P2 via a first penetrating electrode 28 (also referred as a bump) penetrating the dielectric layer 50 are formed in the second wiring layer 52.

As shown in FIG. 5 and FIG. 6, the ground layer 27 is formed as a solid layer that covers the entire area of the second wiring layer 52, excluding directly below the signal contact pad P1.

As shown in FIG. 5 and FIG. 6, the ground contact pad P2 and the ground layer 27 are electrically connected via the first penetrating electrode 28, and the ground potential of the transmission path 7 is stabilized. Similarly, the ground line 26 and the ground layer 27 are electrically connected via a second penetrating electrode 29 different from the first penetrating electrode 28, and the ground potential of the transmission path 7 is stabilized. The high-frequency signal transmission characteristics are enhanced due to the stability in ground potential. It is to be noted that the first penetrating electrode 28 and the second penetrating electrode 29 are made of the same arbitrary conductive material (for example, a metal such as copper or silver, or a conductive resin mixed with metal particles such as copper or silver), but they are distinguished because the former is provided for the ground contact pad P2 and the latter is provided for the ground line 26. Needless to say, two or more first penetrating electrodes 28 can be assigned to one ground contact pad P2.

In order to electrically connect the ground line 26 to the ground layer 27, a plurality of second penetrating electrodes 29 penetrating the dielectric layer 50 may be arranged in the same row (or on the same line) as the first penetrating electrodes 28 at a predetermined interval in the longitudinal direction of the FPC 2. As can be seen from reference in FIG. 5, the interval between the first penetrating electrode 28 and the second penetrating electrode 29 immediately adjacent thereto may be different from (for example, less than) the predetermined interval of the second penetrating electrode 29. Thus, as described later, the intended alignment of the first penetrating electrode 28 and the ground contact terminal 46 can be promoted. By assigning the first penetrating electrode 28 to the ground contact pad P2, ripple generation is suppressed as described below, regardless of the pitch of the second penetrating electrode 29.

Figure 7:
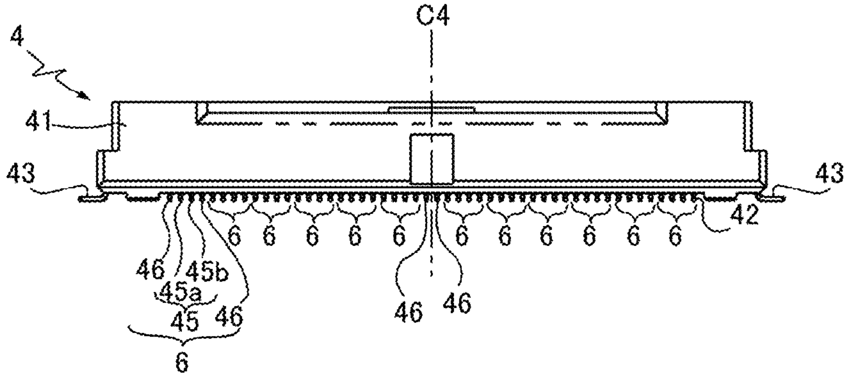
FIG. 7 is a schematic side view of a connector.
Figure 8:
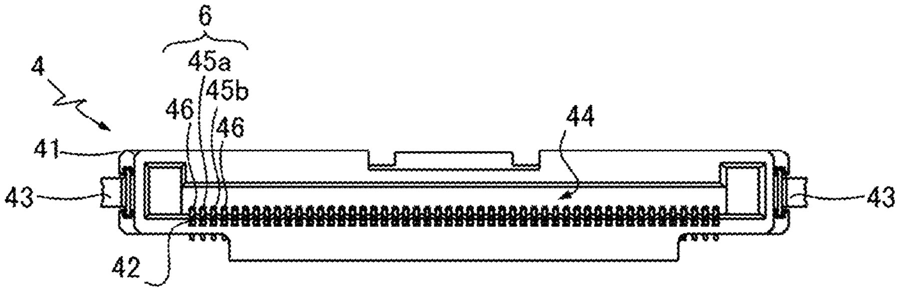
FIG. 8 is a schematic top view of the connector, and an opening in the insertion space into which the FPC is inserted is illustrated.

To further explain the connector 4 by referring to FIG. 7 and FIG. 8, a plurality of signal contact terminals 45 and a plurality of ground contact terminals 46 are supported by an insulator 41 (for example, with constant or different array pitches). Typically, the signal contact terminal 45 and the ground contact terminal 46 are provided so as to be individually contactable with respect to the signal contact pad P1 and the ground contact pad P2 arranged on one surface of the FPC 2, but another arrangement form can also be adopted. For high-frequency signal transmission, in some cases, a unit array 6 is arranged in the width direction of the connector 4 in which two signal contact terminals 45*a*, 45*b* (collectively referred to as signal contact terminals 45) are sandwiched between two ground contact terminals 46.

The connector 4 may have a constant or different (for example, two or more) array pitch with respect to the contact terminal 42. In the former case, in the array of the contact terminals 42, all the contact terminals 42 (all of the signal and ground contact terminals 45, 46) are arranged at a constant pitch (in FIG. 10, D1=E1=F1 is satisfied). In the latter case, the pitch between the immediately adjacent signal contact terminals (F1 in FIG. 10), the pitch between the immediately adjacent ground contact terminals (D1 in FIG. 10), and the pitch between the immediately adjacent signal contact terminal and ground contact terminal are set to be different. It is to be noted that the pitch is defined as the interval between the center lines of the respective contact terminals 42 in the array direction of the contact terminals 42 (typically, equal to the width direction of the connector 4) (moreover, the center line exists in a plane orthogonal to the array direction).

Figure 9:
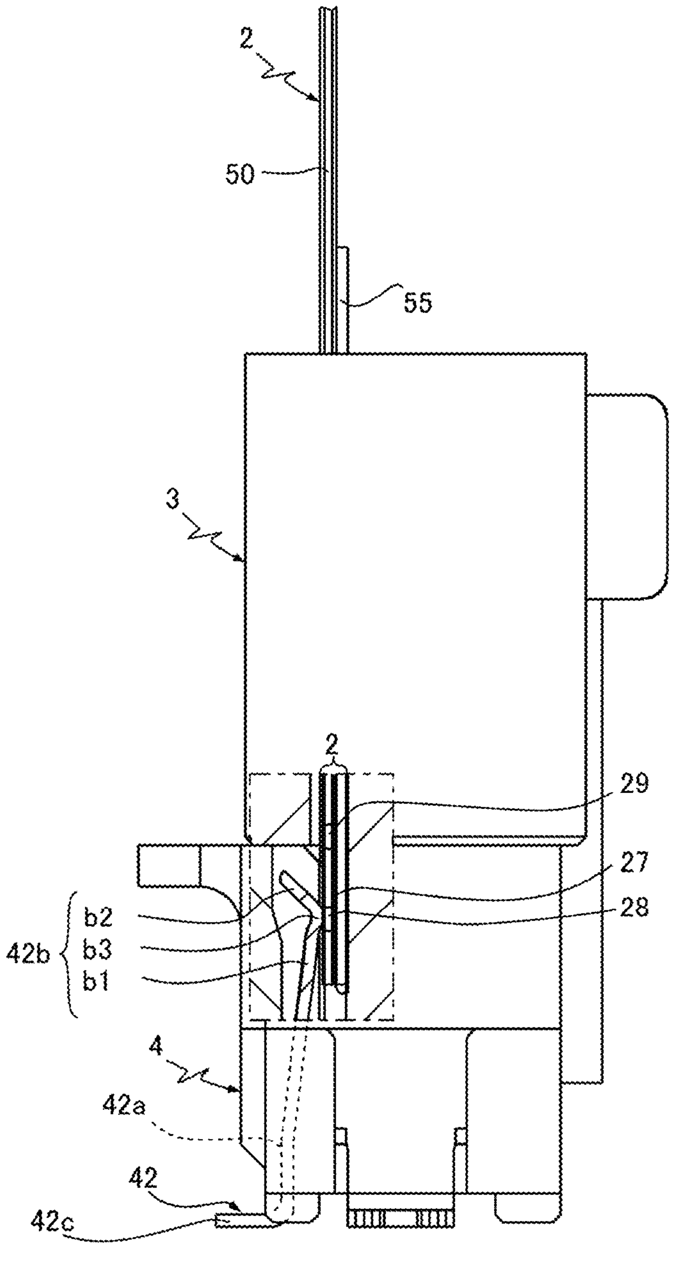
FIG. 9 is a schematic diagram showing a state where the adapter of the FPC is mechanically connected to the connector and the FPC and the connector are electrically connected, and a state where the contact terminal of the connector abuts against the contact pad of the FPC is shown on a partial cross-section.

The contact terminals 42 (signal contact terminal 45 and ground contact terminal 46) are typically metal plates bent at one or more places, supported by the insulator 41 of the connector 4 in a cantilever beam shape, and can be elastically displaced (see FIG. 9). When the adapter 3 is not mechanically connected to the connector 4, the contact terminal 42 takes the initial position. When the adapter 3 is mechanically connected to the connector 4, the contact terminal 42 is pushed by the FPC 2 and displaced.

The contact terminal 42 may have an arm portion bent so as to locally abut against the contact pad at a contact portion (see FIG. 9). Specifically, the signal contact terminal 45 may have an arm portion bent so as to locally abut against the signal contact pad P1 at a contact portion. Similarly, the ground contact terminal 46 may have an arm portion bent so as to locally abut against the ground contact pad P2 at a contact portion b3.

More specifically, the contact terminal 42 may have a fixed portion 42*a* fixed to the insulator 41, an arm portion 42*b* extending from the fixed portion 42*a* toward the opening of the insertion space 44 of the insulator 41, and a connecting portion 42*c* electrically connected (for example, by reflow soldering, etc.) to a contact (not shown) on the substrate 9. The arm portion 42*b* has a shape bent to have a contact portion b3 abutting against the signal or ground contact pad P1, P2 between the fixed portion 42*a* and the free end of the arm portion 42*b*. Specifically, the arm portion 42*b* has a first inclined portion b1 and a second inclined portion b2, and the contact portion b3 is formed between them. The first inclined portion b1 is inclined and extends from the fixed portion 42*a*. The second inclined portion b2 is a stub that is inclined to a side opposite to the inclination direction of the first inclined portion b1 and extends. Thus, the contact portion b3 is formed in a convex shape between the first inclined portion b1 and the second inclined portion b2. The free end of the arm portion 42*b* is at one end of the second inclined portion b2 on the opposite side of the contact portion b3.

Figure 10:
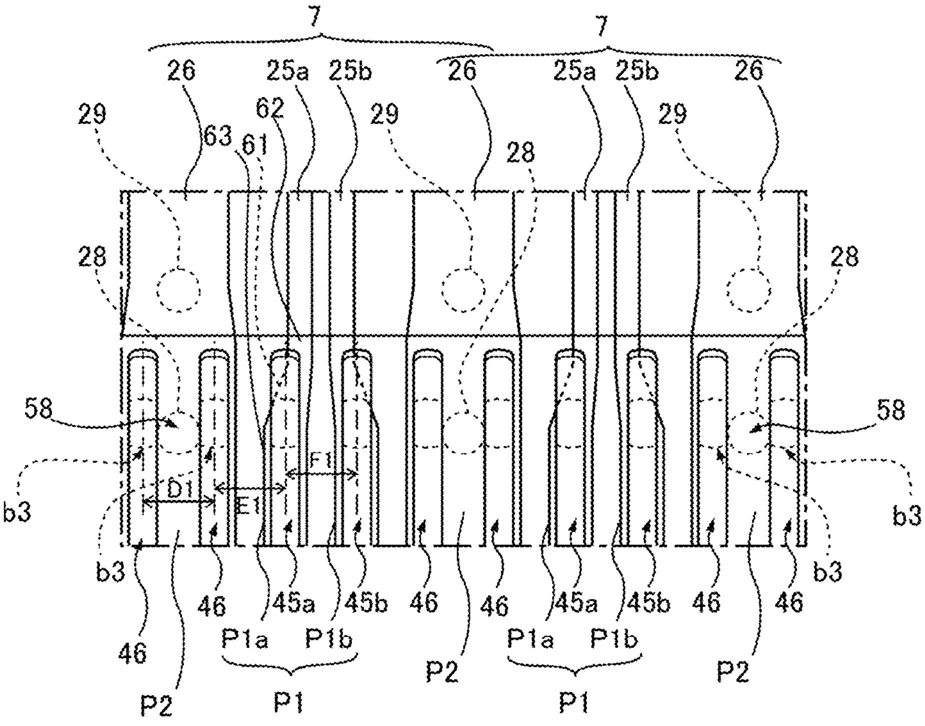
FIG. 10 is a partial schematic diagram showing that in a state where the adapter of the FPC is mechanically connected to the connector and the FPC and the connector are electrically connected, the signal and ground contact terminals of the connector abut against the signal and ground contact pads of the FPC, respectively.

In the present embodiment, when the FPC 2 is electrically connected to the connector 4, the contact portion b3 of the arm portion 42*b* of the ground contact terminal 46 is positioned so as to at least partially abut against the surface of the covering portion 58 of the ground contact pad P2 covering the first penetrating electrode 28 directly above the first penetrating electrode 28, or abut against the ground contact pad P2 near the outer periphery of the covering portion 58 (see FIG. 10). Thus, high-frequency signal transmission characteristics can be improved (for example, see FIG. 11 to FIG. 14). When the contact portion b3 is located near the outer periphery of the covering portion 58, the distance (for example, minimum distance) between the contact portion b3 and the outer periphery of the covering portion 58 is a distance that causes improvement in high-frequency signal transmission characteristics, and specifically, a distance that causes reduction of ripple related to return loss and/or insertion loss in the high frequency band of 20~25 GHz. It is to be noted that the covering portion 58 of the ground contact pad P2 described above is also illustrated in FIG. 6 in addition to FIG. 10. The covering portion 58 is a part of the ground contact pad P2, so the outer periphery of the covering portion 58 is equal to, or understood in light of, a virtual surface (typically a cylindrical surface) that defines the range of the covering portion 58.

When the FPC 2 is electrically connected to the connector 4, the first penetrating electrode 28 may be positioned with an offset in the direction away from the free end of the arm portion 42*b* compared to the contact portion b3 of the arm portion 42*b*. In this case, it can be expected that reduction of ripple related to return-loss and/or insertion loss will be further promoted.

Narrowing the pitch of the contact terminals 42 may be advantageous for achieving the objectives described above. In some cases, the array pitch is in a range of 0.4 mm to 1.0 mm, and preferably, in a range of 0.5 mm to 0.8 mm. In addition, the gap between the contact portion and the outer periphery of the covering portion may be any value greater than 0 mm and less than or equal to 0.4 mm. Even at a short distance, it can be a line for high-frequency signals, but similar improvements in high-frequency signal transmission characteristics is seen by setting a distance of 0.4 mm or less. As an addition or replacement for narrowing the pitch of the contact terminal 42, it may also be advantageous to form the first penetrating electrode 28 in a wider width or wider diameter (in addition, an inexpensive penetrating electrode forming method can also be adopted at the same time).

When the contact portion b3 of the arm portion 42*b* is positioned adjacent to the outer periphery of the covering portion 58 of the ground contact pad P2, it is assumed that the contact portion b3 does not touch the outer periphery of the covering portion 58, and a slight gap is formed between the contact portion b3 and the outer periphery of the covering portion 58. The allowable gap size between the contact portion b3 and the outer periphery of the covering portion 58 is preferably any value greater than 0 mm and less or equal to 0.4 mm. It is to be noted that due to the effects of manufacturing errors, etc., it is also assumed that there are variations in the positions of the contact portion of the ground contact terminal 46 and the covering portion 58. For example, the contact portion of one ground contact terminal 46 abuts against the covering portion 58, the contact portion of another ground contact terminal 46 abuts against the outer periphery of the covering portion 58, and the contact portion of another ground contact terminal 46 may be positioned at a slight interval from the outer periphery of the covering portion 58.

When the FPC 2 is electrically connected to the connector 4, the arm portion 42*b* of the ground contact terminal 46 may extend in the tangential direction with respect to the outer periphery of the covering portion 58 of the ground contact pad P2 covering the first penetrating electrode 28 directly above the first penetrating electrode 28. Typically, the extending direction of the arm portion 42*b* is equal to the insertion direction of the FPC 2 with respect to the connector 4 or the longitudinal direction of the FPC 2.

Two adjacent ground contact terminals 46 included in the unit arrays 6 adjacent in the width direction of the connector 4 are each positioned so as to least partially abut against the surface of at least one common covering portion 58, or abut against the ground contact pad P2 near the outer periphery of the at least one common covering portion 58 (see FIG. 10). In other words, in an adjacent pair of GSSG arrays of the contact terminals 42, a pair of immediately adjacent ground contact terminals 46 (that is, the central GG pair in "GSSGGSSG") is positioned as described above with respect to a common covering portion 58 (or, a common first penetrating electrode 28). Thus, high-frequency signal transmission characteristics can by improved with a small number of first penetrating electrodes 28, and for example, adoption of an inexpensive penetrating electrode forming method is promoted. Also, optimally, one first penetrating electrode 28 is assigned to one ground contact pad P2 for electrical connection with the ground layer 27.

The first penetrating electrode 28 and the second penetrating electrode 29 are arranged in the same row (or on the same line) along the longitudinal direction of the FPC 2, and the contact portion b3 of the ground contact terminal 46 is not arranged directly above the first penetrating electrode 28 (and the covering portion 58 of the ground contact pad P2). The first penetrating electrode 28 is formed at a position of the width center of the ground contact pad P2, the second penetrating electrode 29 becomes easier to form at a position of the width center of the ground line 26, and the FPC 2 can be manufactured by a cheaper method with respect to the position accuracy of the penetrating electrode in the width direction of the FPC 2.

When the first penetrating electrode 28 has a cylindrical or truncated cone shape, the covering portion 58 has a circular outer periphery, and the arm portion 42*b* can extend in the tangential direction of its outer periphery. However, it is also possible to form the first penetrating electrode 28 so that it has a polygonal outer periphery such as a triangle, a square, or a pentagon.

As shown in FIG. 10, the signal contact pads P1*a*, P1*b* may have a width variation portion 61 where the pad width is displaced as it extends in the longitudinal direction of the FPC 2. The width variation portion 61 is provided between a width narrow portion 62 and a width wide portion 63, and the pad width changes continuously between these.

Figure 11:
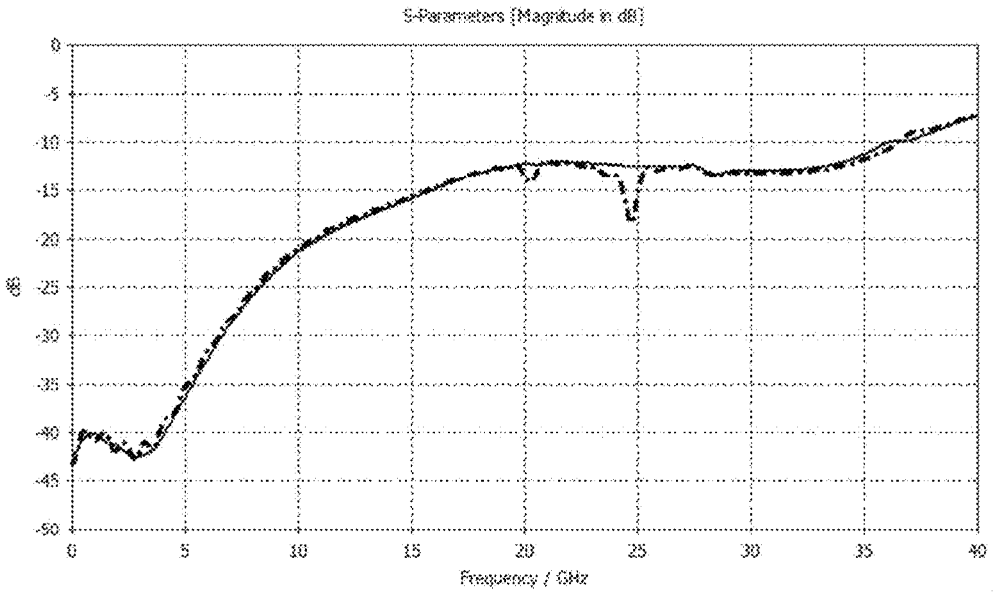
FIG. 11 is a simulation result showing improvement in return-loss.
Figure 12:
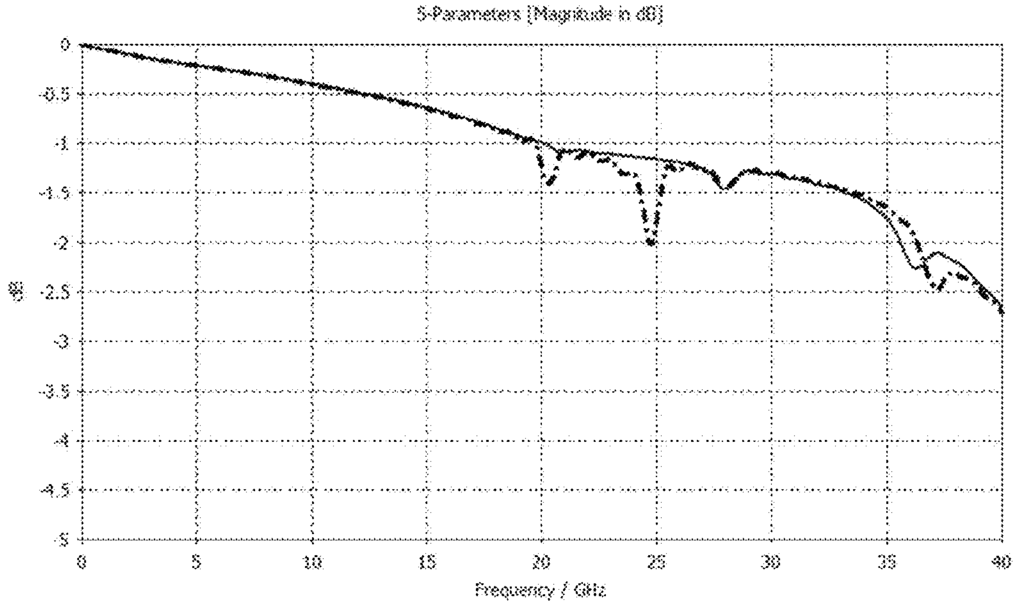
FIG. 12 is a simulation result showing improvement in insertion loss.
Figure 13:
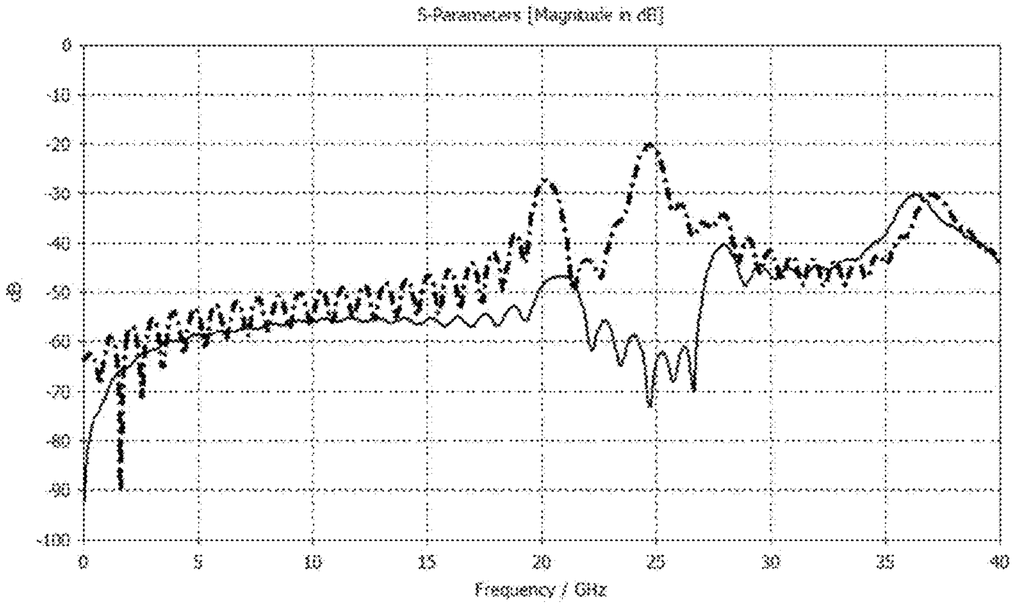
FIG. 13 is a simulation result showing improvement in near-end crosstalk.
Figure 14:
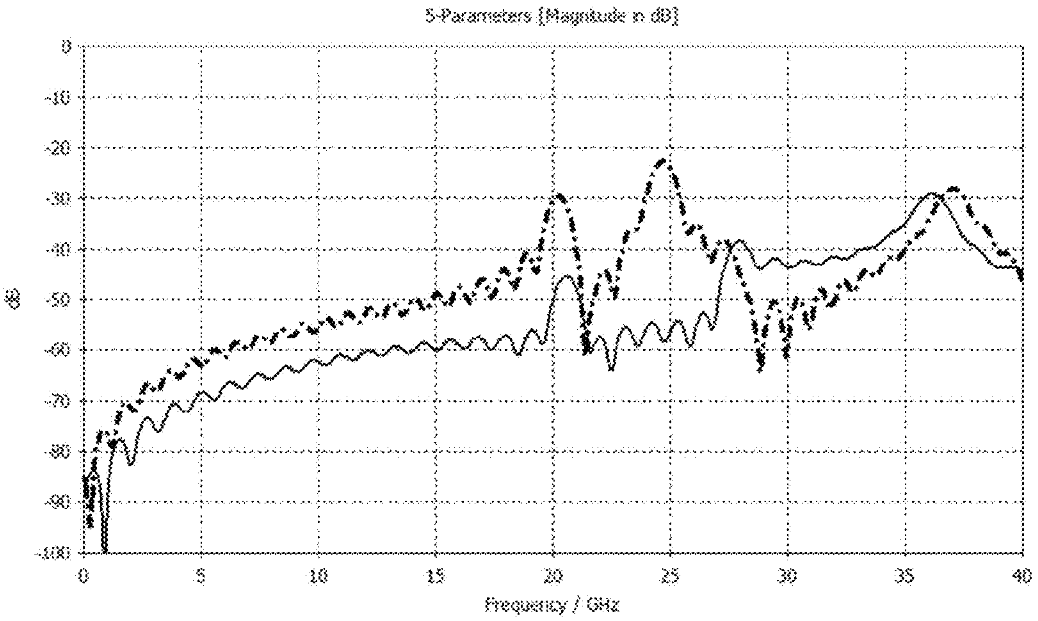
FIG. 14 is a simulation result showing improvement in far-end crosstalk.

In the simulation result shown in FIG. 11 to FIG. 14, a solid line shows high-frequency signal transmission characteristics according to Examples shown in FIG. 1 to FIG. 10, and a dashed line shows high-frequency signal transmission characteristics according to a Comparison Example where there is no first penetrating electrode 28 shown in FIG. 10. As shown in FIG. 11, return-loss has been improved. As shown in FIG. 12, insertion loss has been improved. As shown in FIG. 13, near-end crosstalk has been improved. As shown in FIG. 14, far-end crosstalk has been improved. In particular, as can be seen from FIG. 11 to FIG. 14, in the Examples, ripple was suppressed around 20~25 GHz.

The FPC 2 can be manufactured by a bump build-up method. In the bump build-up method, many bumps are formed on the first surface of the first copper foil, and a dielectric layer (for example, liquid crystal polymer) and a second metal foil are laminated in this order on the first surface of the first metal foil on which the bumps have been formed. Thereafter, the first metal foil, the dielectric layer, and the second metal foil are closely bonded by heat pressing. In this laminated body, the first metal foil and the second metal foil are electrically connected via a penetrating electrode derived from a bump. One of the first and the second metal foils is used as a first wiring layer 51, and the other one is used as a second wiring layer 52. A signal line, a ground line, a ground layer, and a contact pad can be formed by patterning (for example, selective etching) of the metal foil. Copper foil can be used as the metal foil. Other manufacturing methods for the FPC 2 can also be used.

The insulator 41 of the connector 4 can be manufactured from plastic material using an injection molding device. The contact terminal 42 can be manufactured by processing (punching, bending) a metal plate. The contact terminal 42 can be attached to and supported by the insulator 41 by methods such as insert molding, press fitting, bonding, etc.

Figure 15:
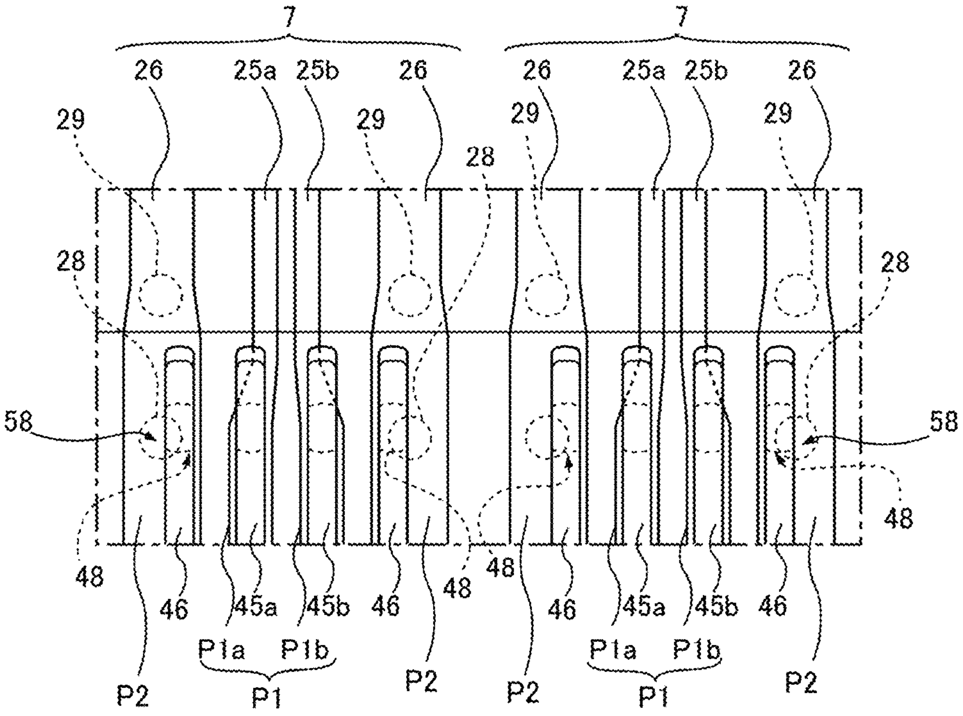
FIG. 15 is a schematic diagram according to another example in which two ground lines are formed between differential signal lines.

In FIG. 10, one ground line 26 was formed between differential signal lines 25, and one ground contact pad P2 was provided between a pair of signal contact pads P1*a*, P1*b*, but it is not limited to this. As shown in FIG. 15, two ground lines 26 can be formed between the differential signal lines 25, and two ground contacts pad P2 can be provided between a pair of signal contact pads P1*a*, P1*b*. In other words, one ground contact pad P2 (or ground line 26) can also be assigned to one ground contact terminal 46.

In FIG. 10, the arm portion 42*b* of the ground contact terminal 46 extends in the tangential direction related to the outer periphery in such a state where it does not overlap the covering portion 58 of the ground contact pad P2, but it is not limited to this. As shown in FIG. 15, the arm portion 42*b* of the ground contact terminal 46 can extend in the tangential direction related to the outer periphery in such a state where it overlaps a part of the covering portion 58 of the ground contact pad P2. It is to be noted that in the case of FIG. 10, the arm portion 42*b* and the contact portion b3 are not arranged directly above the first penetrating electrode 28. In the case of FIG. 15, the arm portion 42*b* and the contact portion b3 are partially arranged directly above the first penetrating electrode 28. By making the width of the arm portion 42*b* of the ground contact terminal 46 wider, it is also possible for the arm portion 42*b* to overlap the entire covering portion 58 directly above the first penetrating electrode 28.

Figure 16:
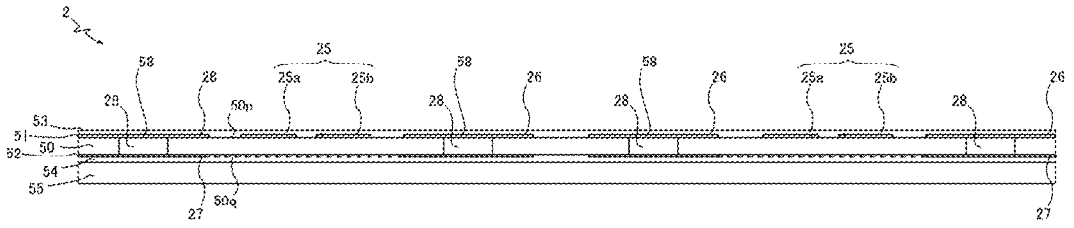
FIG. 16 is a schematic diagram according to another example in which changes have been made with respect to the ground layer.

In the form shown in FIG. 16, the transmission path 7 is configured as a combination of a differential coplanar line and a microstrip line, and the ground layer 27 may be formed to face the transmission path 7, excluding directly below the contact pad P1. Typically, a plurality of ground layers 27 are formed in the second wiring layer 52 and their number is equal to the number of the transmission paths 7. By electrically connecting the ground line 26 and ground contact pad P2 corresponding to each transmission path and the ground layer 27, ground potential can be classified or decommoned between the transmission paths 7 of the FPC 2, and high-frequency signal transmission characteristics can be enhanced (for example, crosstalk is reduced). Also, in such a form, it is expected that the same effect as described above can be obtained by setting the alignment of the first penetrating electrode 28 and the ground contact terminal 46 as described above.

Based on the instructions described above, a person skilled in the art can make various changes to each embodiment and each feature. The wiring board does not need to be flexible and should not be limited to flexible cables. For example, various features disclosed in the present application can be applied to the wiring board of a card edge connector. The number of ground contact terminals provided between signal contact terminal pairs for differential signal transmission is not limited to 2, but may be 1. The same effect can be expected even if an adapter is omitted from the connector.

What is claimed is:

1. A high-frequency signal transmission device, comprising:

a connector in which a contact terminal group with a plurality of contact terminals arranged in a regular manner is supported by an insulator, the plurality of contact terminals comprising a plurality of signal contact terminals and a plurality of ground contact terminals; and a wiring board in which a plurality of signal contact pads, a plurality of ground contact pads, and one or more ground layers are formed on at least one of cable ends, and the one or more ground layers are electrically connected to the ground contact pads via at least one first penetrating electrode penetrating a dielectric layer of the wiring board, wherein the ground contact terminal comprises an arm portion bent so as to locally abut against the ground contact pad at a contact portion, when the wiring board is electrically connected to the connector, the contact portion of the arm portion is positioned so as to at least partially abut against a surface of a covering portion of the ground contact pad covering the first penetrating electrode directly above the first penetrating electrode.

2. A high-frequency signal transmission device comprising:

a connector in which a contact terminal group with a plurality of contact terminals arranged in a regular manner is supported by an insulator, the plurality of contact terminals comprising a plurality of signal contact terminals and a plurality of ground contact terminals; and a wiring board in which a plurality of signal contact pads, a plurality of ground contact pads, and one or more ground layers are formed on at least one of cable ends, and the one or more ground layers are electrically connected to the ground contact pads via at least one first penetrating electrode penetrating a dielectric layer of the wiring board, wherein the ground contact terminal comprises an arm portion bent so as to locally abut against the ground contact pad at a contact portion, when the wiring board is electrically connected to the connector, the contact portion of the arm portion is positioned so as to (i) at least partially abut against a surface of a covering portion of the ground contact pad covering the first penetrating electrode directly above the first penetrating electrode, or (ii) abut against the ground contact pad near an outer periphery of the covering portion, the contact terminal group comprises unit arrays in which two signal contact terminals are sandwiched by two ground contact terminals, two adjacent ground contact terminals comprised in the unit arrays adjacent in a width direction of the connector are each positioned so as to (i) at least partially abut against a surface of at least one common covering portion, or (ii) abut against the ground contact pad near an outer periphery of the at least one common covering portion.

3. The high-frequency signal transmission device according to claim 2, wherein ripple associated with return-loss and/or insertion loss is reduced in a high frequency band.

4. The high-frequency signal transmission device according to claim 2, wherein when the wiring board is electrically connected to the connector, the first penetrating electrode is positioned by offset in a direction away from a free end of the arm portion compared to the contact portion of the arm portion.

5. The high-frequency signal transmission device according to claim 2, wherein a plurality of second penetrating electrodes penetrating the dielectric layer are arranged in the same row with the first penetrating electrodes at a predetermined interval in a longitudinal direction of the wiring board so as to electrically connect a ground line formed in the same layer as the ground contact pad to the ground layer, the interval between the first penetrating electrode and the second penetrating electrode immediately adjacent thereto is different from the predetermined interval of the plurality of second penetrating electrodes.

6. The high-frequency signal transmission device according to claim 2, wherein the first penetrating electrode has a cylindrical or truncated cone shape, and the arm portion extends in a tangential direction of the outer periphery of the covering portion.

7. The high-frequency signal transmission device according to claim 2, wherein the plurality of signal and ground contact pads are arranged in a width direction of the wiring board to form a unit array in which a pair of signal contact pads is sandwiched by two ground contact pads, and one ground contact pad is provided between the pair of signal contact pads adjacent in the width direction of the wiring board.

8. The high-frequency signal transmission device according to claim 2, wherein the wiring board comprises a plurality of differential signal lines each composed of two signal lines and a plurality of ground lines formed on both sides so as to sandwich each differential signal line in a width direction of the wiring board, one ground line is provided between the differential signal lines adjacent in the width direction of the wiring board.

9. The high-frequency signal transmission device according to claim 2, wherein one said first penetrating electrode is assigned to one said ground contact pad for electrical connection with the ground layer.

10. The high-frequency signal transmission device according to claim 2, wherein the one or more ground layers comprise a plurality of ground layers each extending in a longitudinal direction of the wiring board, and the plurality of ground contact pads are individually electrically connected to the plurality of ground layers via the first penetrating electrode.

11. The high-frequency signal transmission device according to claim 10, wherein the wiring board further comprises a plurality of ground lines formed in the same layer as the plurality of ground contact pads, and each ground line of the plurality of ground lines is electrically connected to each ground layer of the plurality of ground layers via a plurality of second penetrating electrodes penetrating the dielectric layer.

12. The high-frequency signal transmission device according to claim 2, further comprising an adapter that supports the cable end of the wiring board and is mechanically connected to the connector, wherein the cable end is positioned at a predetermined position in the connector by mechanical connection between the connector and the adapter.

13. An electrical connection method for a wiring board and a connector in which a contact terminal group with a plurality of contact terminals arranged in a regular manner is supported by an insulator, the plurality of contact terminals comprising a plurality of signal contact terminals and a plurality of ground contact terminals, wherein a plurality of signal contact pads, a plurality of ground contact pads, and one or more ground layers are formed on at least one of cable ends of the wiring board, and the one or more ground layers are electrically connected to the ground contact pads via at least one first penetrating electrode penetrating a dielectric layer, and wherein the method comprises a step of positioning a contact portion of the ground contact terminal so as to (i) at least partially abut against a surface of a covering portion of the ground contact pad covering the first penetrating electrode directly above the first penetrating electrode, or (ii) abut against the ground contact pad near an outer periphery of the covering portion, wherein the contact terminal group comprises a plurality of unit arrays in which two signal contact terminals are sandwiched by two ground contact terminals, and two adjacent ground contact terminals comprised in the unit arrays adjacent in a width direction of the connector are each positioned so as to (i) at least partially abut against a surface of at least one common covering portion, or (ii) abut against the ground contact pad near an outer periphery of the at least one common covering portion.

* * * * *